Feb. 16, 1943.   A. F. KLASING   2,311,398
BRAKE OPERATING MECHANISM
Filed June 1, 1942   4 Sheets-Sheet 2
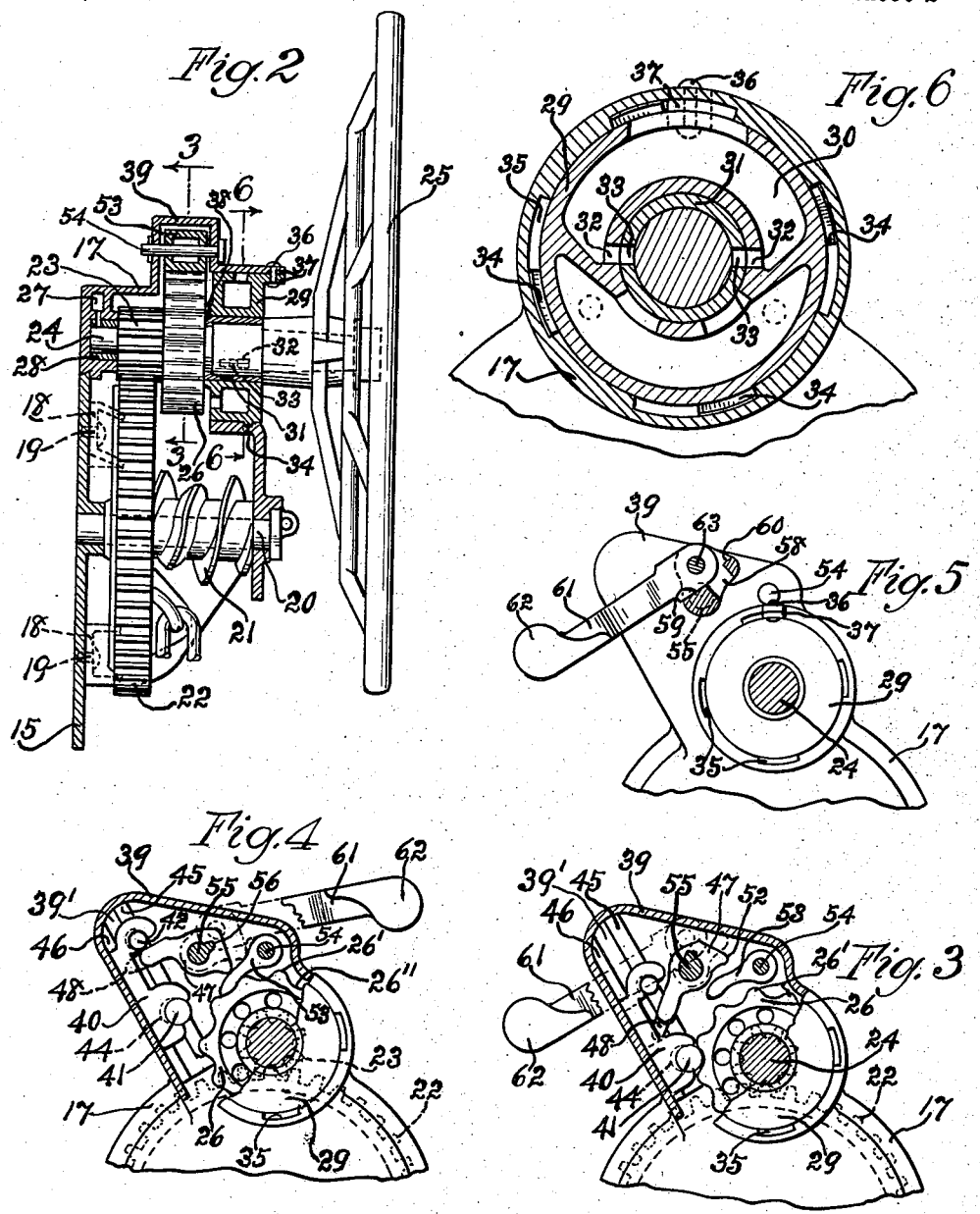
Inventor
Augustus F. Klasing
by J. Daniel Stuwe
Attorney.

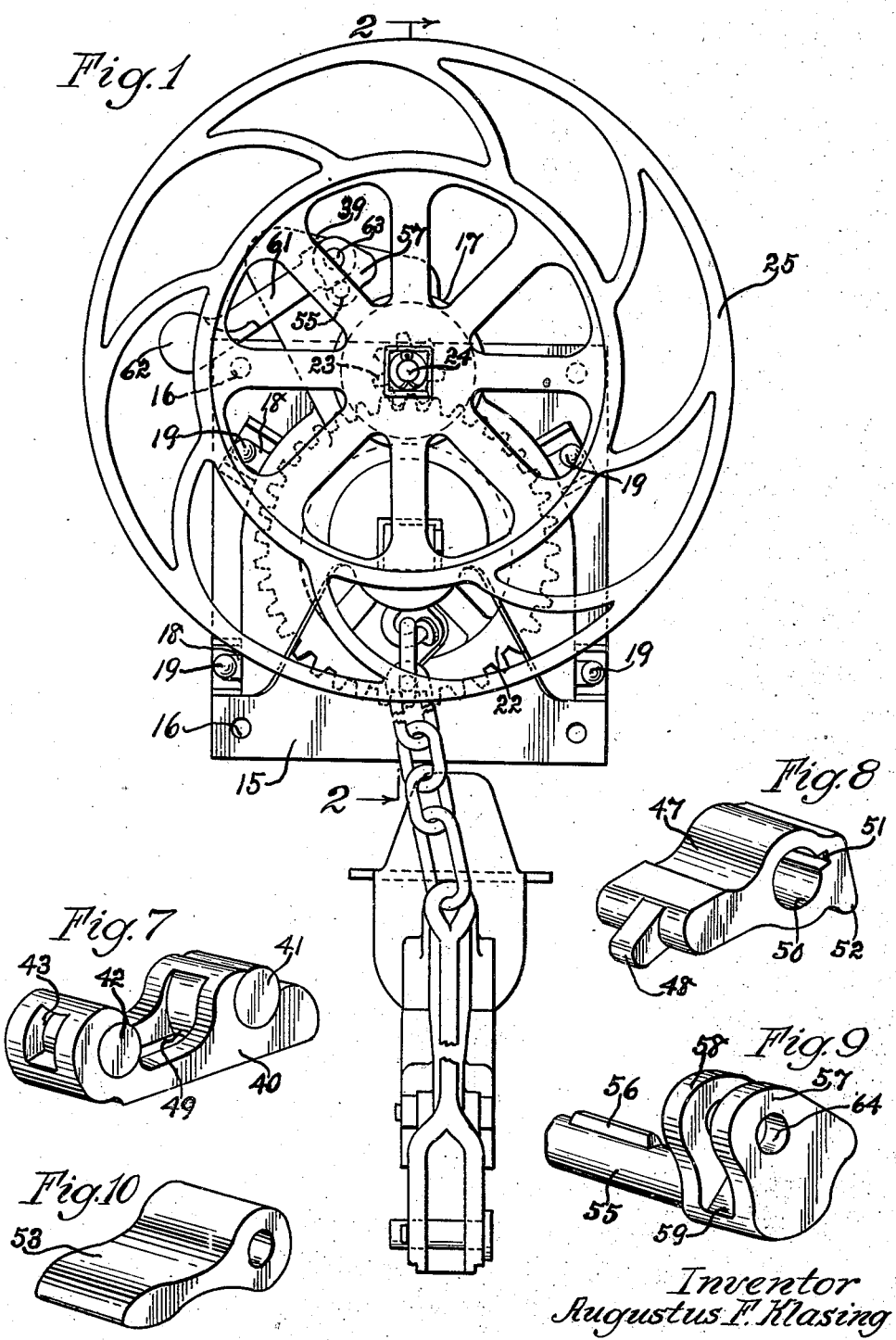
Feb. 16, 1943.    A. F. KLASING    2,311,398
BRAKE OPERATING MECHANISM
Filed June 1, 1942    4 Sheets-Sheet 1
Inventor
Augustus F. Klasing
by J. Daniel Stuwe
Attorney.

Feb. 16, 1943. A. F. KLASING 2,311,398
BRAKE OPERATING MECHANISM
Filed June 1, 1942 4 Sheets-Sheet 3
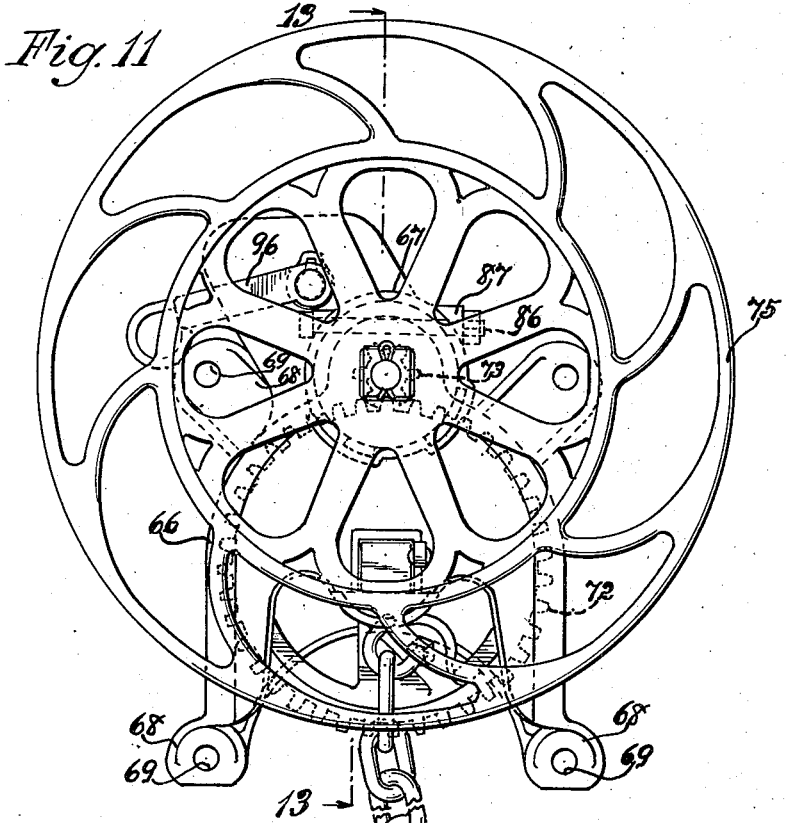
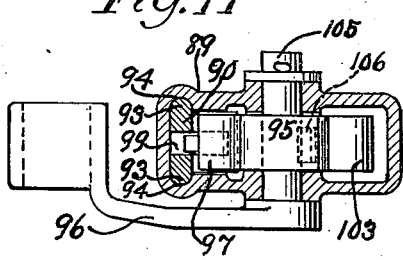
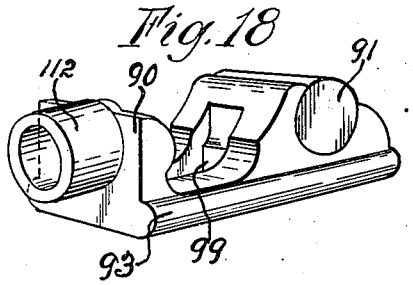
Inventor
Augustus F. Klasing
by J. Daniel Stuwe
Attorney.

Feb. 16, 1943.   A. F. KLASING   2,311,398
BRAKE OPERATING MECHANISM
Filed June 1, 1942   4 Sheets-Sheet 4
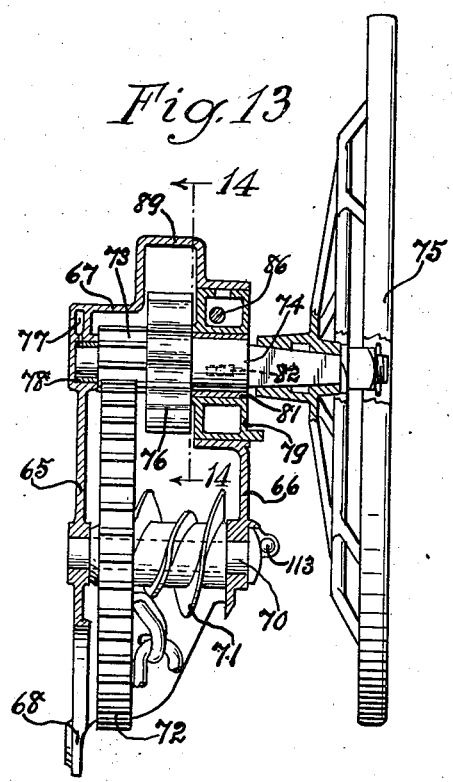
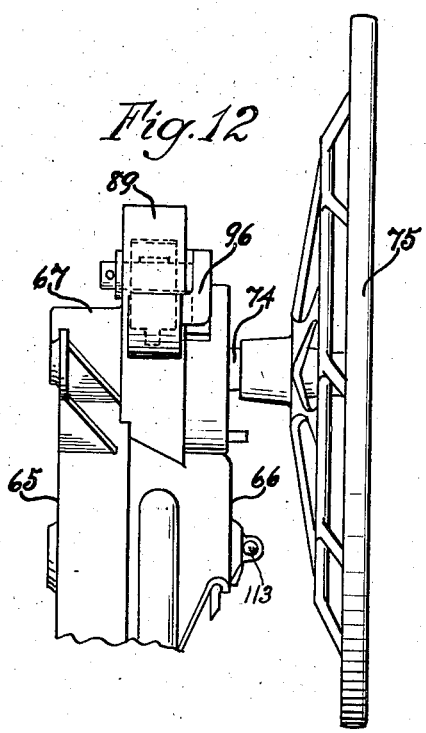
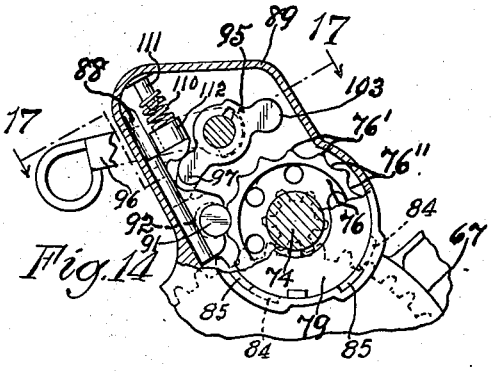
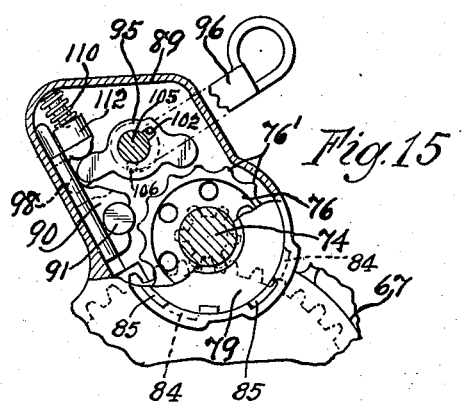
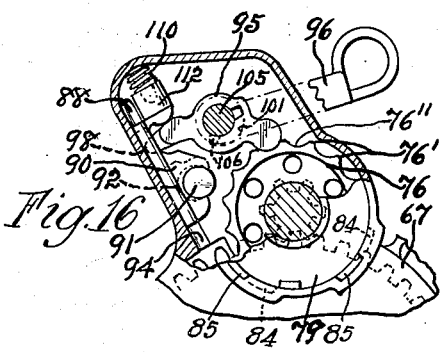
Inventor
Augustus F. Klasing
by J. Daniel Stuwe
Attorney.

Patented Feb. 16, 1943

2,311,398

UNITED STATES PATENT OFFICE 2,311,398

BRAKE OPERATING MECHANISM

Augustus F. Klasing, Joliet, Ill.

Application June 1, 1942, Serial No. 445,262

19 Claims. (Cl. 74—505)

This invention relates to improvements in brake operating mechanism, and more particularly to hand brake mechanism used for operating railway car brakes.

Brake operating devices for freight cars are commonly applied to the ends of the car bodies and involve the use of a manually operated brake member, usually a brake wheel of substantial diameter, acting thru suitable speed reducing gears to exert a pull on the brake chain for applying the brakes.

In the operation of such devices it is common to employ pawl and ratchet means for holding the brakes applied or set, the pawl being manually operable. However, in operation of the brake wheel in applying the brakes the pawl rides over the teeth of the ratchet, and in the course of time said teeth become worn and the holding effect is lessened or even destroyed.

An essential object of my invention is to overcome such defect and to provide an equivalent for, and an improvement over, the usual pawl and ratchet means, and in a form in which no appreciable wear will take place thru a long period of time, at least as long a time as the life of the car. This I accomplish by providing, in lieu of the usual ratchet wheel, a wheel wherein the periphery is composed of a series of shallow depressions and the elevations between the depressions consist of blunt, gradually rounded elevations, instead of the usual sharp ended ratchet teeth; and co-operating with this novel form of ratchet wheel is a sliding, tangentially moving holding pawl or detent including a rounded stop element which is preferably in the form of a roller. By this arrangement and construction the area in engagement between the surfaces of the rotating wheel and the tangentially moving pawl member are largely in rolling contact, and since the projecting portions in lieu of teeth on the rotating wheel are blunt and rounded, no substantial or damaging wear will take place.

Furthermore, in the operation of such brake mechanism, particularly in spotting cars, it is customary for the brakeman to slack off the brakes without allowing the brake chain to unwind completely. In the known prior mechanisms, the effect of re-engaging the pawl with the spinning wheel produces a relatively great shock resulting in possible damage or breakage unless the parts are made of otherwise unnecessarily large size and weight. Whereas, in my mechanism I have provided a novel dampening or retarding pawl in the form of a pawl member adapted to be either held free from the ratchet wheel or likewise to be entered into the depressions in the wheel and to be held and pressed firmly therein by means of the release lever used for releasing the holding pawl. With this arrangement the operator may, at his pleasure, release the brake one notch at a time, and without any shock to the mechanism. This retarding pawl and mechanism is moreover so arranged that by regulating the pressure manually on the brake releasing lever the novel retarding pawl can be either pressed lightly or forced heavily against the ratchet wheel and into its depressions, so as to retard only slightly the releasing of the applied brakes, or likewise to strongly retard the same and even positively halt the brake releasing action.

This application is a continuation-in-part of my prior application for patent for Brake operating mechanism, Serial No. 380,133, filed February 24, 1941, and includes the subject matter thereof.

In the drawings:

Fig. 1 is a front elevation of brake operating mechanism constructed in accordance with my invention.

Fig. 2 is a vertical sectional view thereof, taken substantially on line 2—2 of Fig. 1.

Fig. 3 is a sectional view of the operating means, taken on line 3—3 of Fig. 2, showing the parts in locked position.

Fig. 4 is a similar view, showing the parts in released position, with the retarding pawl held against the ratchet wheel. (In Figs. 3 and 4 the operating handle would not appear, since it is on the outside of the housing, as shown in Fig. 5; and it is thus shown as broken and in dot-and-dash lines.)

Fig. 5 is an elevation showing the release lever in its proper relation outside of the housing.

Fig. 6 is an enlarged sectional vew, taken on line 6—6 of Fig. 2, showing the grease pockets for the operating shaft.

Figs. 7, 8, 9 and 10 are perspective views of the parts constituting the control mechanism.

Fig. 11 is a front elevation of a slightly modified form of brake operating mechanism constructed in accordance with my invention.

Fig. 12 is a side elevation thereof.

Fig. 13 is a vertical sectional view thereof, taken on line 13—13 of Fig. 11.

Fig. 14 is a sectional view, taken on line 14—14 of Fig. 13, showing the holding pawl in locked position.

Fig. 15 is a similar view, but showing the holding pawl as well as the retarding pawl in the release position.

Fig. 16 is another view, showing the holding pawl in its released position and the retarding pawl pressed between the teeth of the ratchet wheel for retarding the brake releasing action. (In these Figs. 14, 15 and 16 the operating lever would not appear, since it is outside of the housing, as indicated in Fig. 5; and it is therefore shown broken and in dot-and-dash lines.)

Fig. 17 is an enlarged sectional view, taken on line 17—17 of Fig. 14, showing the slidable pawl means and the operating lever.

Fig. 18 is a perspective view of the slidable holding pawl.

Fig. 19 is an elevational view of the oscillating operating member or arm having at one end the retarding pawl and at the opposite end the finger for operating the holding pawl.

Fig. 20 is a part plan and part sectional view, taken on line 20—20 of Fig. 19.

Referring to the drawings it will be seen that my brake operating means or unit, in the form illustrated in Figs. 1 to 10, inclusive, comprises a plate 15 having rivet holes 16 by means of which the mechanism is secured to the car end. The housing for the operating mechanism, indicated generally by the numeral 17, interfits with plate 15 at its upper end and is provided with suitable ears 18. Rivets 19 serve as means of attachment of the housing 17 to the plate. Said housing and the plate provide bearings for a shaft 20 which carries the chain-worm 21 and the gear 22; and said gear meshes with a pinion 23 fast on a shaft 24 which carries on the outer end the member for operating it manually, as the hand brake wheel 25. Also secured on this shaft 24 is my improved ratchet wheel 26 which is provided with blunt, gradually rounded projections 26' around its periphery and shallow depressions 26" between the same.

The housing 17 is provided with grease pockets, including a pocket 27 for supplying lubricant thru a bushing 28 to the inner end of the shaft 24; and at the outer end the housing is provided with a suitable recess for receiving a grease pocket member 29, as best shown in Figs. 2 and 6. Said member 29 is circular in outline and has an internal annular recess 30 for grease, the grease being supplied to the shaft thru a bushing 31 by means of openings 32, 33 in the respective parts. Said pocket member 29 is provided with peripheral projections 34 engaging with suitable recesses 35 in the housing to form a breech block connection; and said member is held in the proper locked position by means of a rivet 36 passing thru an opening in registering ears 37 in the member and the housing.

The bushing 31 is locked in place by bending outwardly the inner end portions 38 into suitable notches formed in said member 29, as shown in Fig. 2.

The operating and control mechanism is housed and protected within an upper portion 39 of the housing 17, wherein a side wall is arranged to provide a slideway 39'. The mechanism comprises a tangentially sliding pawl or detent 40, best shown in Fig. 7, operating on said slideway, and the pawl contains a hardened steel roller 41, for engaging with the depressions 26" in the ratchet wheel, said pawl thus providing the locking or holding pawl or detent for securely retaining the ratchet wheel in place; and said pawl also contains a roller 42 for engagement by an operating finger of the manual release means. A grease pocket 43 is provided for roller 42 and a grease pocket 44 for the roller 41; while the ends of said rollers slide alongside ribs 45 formed on the inner walls of the housing, thus preventing escape of the rollers laterally of the sliding pawl and confining them in the housing. Similar side ribs 46 in the housing serve to guide this sliding pawl in its movement.

The means for operating the sliding pawl or detent 40 comprises an arm 47, best shown in Fig. 8, including an elongated body of metal, from one end of which extends a central projection or finger 48 which engages within a recess 49 formed in the sliding pawl. In lifting the pawl for retracting it from its holding position, shown in Fig. 3, this projection 48 contacts and rolls on the roller 42, thus reducing the frictional resistance. The body part of said arm 47 contains a transverse opening 50 having a keyway 51 therein; and the portion beyond said opening, opposite the finger 48, terminates in a cam projection 52 for engagement with a dampening or retarding pawl 53, best shown in Fig. 10. This pawl 53 is mounted on a shaft 54 extending thru the upper portion 39 of the housing, and is adapted to ride on the ratchet wheel without action.

The pawl operating means or arm 47 is mounted on a shaft 55 having a fixed key 56 thereon for engagement with the keyway 51 in said arm, the shaft having a bearing in the side walls of the housing portion 39. At one end of this shaft 55, and located outside of said housing portion 39, is a head consisting chiefly of two ears 57 and 58, the ends of the space or recess between these ears providing two abutments 59 and 60. An operating lever or handle bar 61, provided with a weighted head 62, is mounted between said ears on a pivot 63 positioned in openings 64 in the ears. The two opposite sides of this lever, adjacent pivot 63, are adapted to alternately contact the abutments 59 and 60, as best shown in Fig. 5. The lever is thus free to be oscillated thru nearly 180 degrees; and this freedom of oscillation enables the lever to unseat the holding pawl 40 readily from its engagement with the ratchet wheel 26, and altho the parts are in wedging relation but little force is necessary for disengaging said holding pawl. This serves to provide a trip release.

The dismantling of the structure is simple, involving merely the removal of the rivet or bolt 36, then rotating the grease pocket 29 into the disengaging position, whereupon the hand wheel, wheel shaft, ratchet wheel and pinion may be removed as a unit. For reassembly, the operation is reversed except that the holding pawl or detent and the dampening pawl must be held in an elevated position while the described parts are slid into place.

In Figs. 11 to 20, inclusive, I have illustrated my invention in a slightly modified form, and herein the structure comprises a casing including a rear plate portion 65 and a front or outer portion 66 with an upper portion 67 thereon, providing a housing for the operating mechanism. Ears 68 are provided on the rear plate portion having rivet holes 69 for securing the apparatus to the car end.

The rear and front portions 65 and 66 provide bearings for a shaft 70 which carries a chain-worm 71 and a gear 72 thereon. The gear meshes with a pinion 73 fast on an operating shaft 74 which carries on its outer end the manually operated member, as the hand brake wheel 75; and fast on this shaft 74 is also my improved ratchet wheel 76 which has gradually rounded projections 76' on its periphery and similar rounded depressions 76" between said projections.

The housing portion 67 is provided with a grease pocket 77 for supplying lubricant thru the bushing 78 to the inner end of the shaft 74; while at the outer end of said shaft the front portion 66 is provided with a suitable recess for receiving a grease containing member 79, as shown in Fig. 13, said member being circular and having an internal annular recess or pocket to have grease packed therein, and carries a bushing 81, the grease being supplied to the shaft thru registering openings 82 in said member and bushing. Said member 79 is provided with peripheral projections 84 engaging with recesses 85 in the housing to form a breech lock, and the member is held in locked position by means of a bolt 86 passing thru registering openings in the member and in lugs 87 on the housing.

The brake operating and control mechanism is housed in the upper housing portion 67, whereon is provided a slantingly upwardly extending casing or housing part 89 which is provided with a slideway 88 on its slanting side wall. The mechanism comprises a detent or pawl 90, being substantially in the form of a shoe-like casting, best shown in Fig. 18, which is slidable on said slideway, in a direction tangentially to the ratchet wheel 76. Said detent contains a hardened steel roller 91 for engaging in the depressions in the ratchet wheel 76, and provides the locking or holding pawl. The roller is confined against separation from the detent by the sides of the slideway and casing part 89, and a grease pocket 92 is provided for the roller. This detent has side ribs 93 which are slidable in grooves 94 provided at the sides of the slideway 88 in said casing part 89.

The means for operating the slidable detent comprises an operating member or arm 95 in the housing, operated by an oscillatory lever or handle bar 96 located outside of the housing. Said member 95 includes an elongated body of metal from one end 97 of which extends a central projection or finger 98 engaging in a recess 99 formed in the sliding detent. The intermediate body part of this member contains a transverse aperture 100 with an internal segmental recess 101 partly around the aperture, and a key inlet port 102 leads to the recess. The end part of said member 95, opposite said end 97, terminates in a rounded pawl 103, adapted to fit into the depressions 76" between the ratchet teeth 76', and thus functions as the retarding pawl for restraining the release movement of the ratchet wheel 76.

The operating member 95 is mounted on a shaft 105 which extends laterally from the pivot end of the operating lever 96 and is preferably integral therewith, having bearing in the side walls of the housing part 89. This shaft 105 has a key 106 fixed thereon, adapted to be inserted thru the port 102 and being movable freely in the recess 101 during the greater part of the oscillatory movement of the lever 96, until said lever reaches the abutments 107 and 108 formed by the ends of said recess, and will then move the member 95. The lever is thus swingable thru the greater part of its arc of nearly 180 degrees before swinging the member 95, which will then become effective for moving the holding detent 90 into release position and the retarding pawl 103 into operative position, as shown in Fig. 16, and also for releasing the retarding pawl and enabling the holding detent to move into its holding or wedging position, as shown in Fig. 14.

A spring 110 surrounds a pin 111 depending from the upper housing part 89 and is seated in a cup 112 provided on the upper end of the detent 90, thereby normally pressing said detent downwardly. The essential function of this spring is to hold the retarding pawl 103 out of engagement with the ratchet wheel 76 when said pawl is not in use, even when both pawls are in released position, as shown in Fig. 15; the spring thus overcoming the effect of the weight of lever 96, and preventing wear by this pawl of the ratchet teeth 76'.

This structure is easily dismantled. To remove the chain-worm or drum 71, remove the locking rivet 113 from in front of the drum shaft 70, then pull out said shaft and drop said worm with the gear 72. To remove the brake operating parts from the housing, remove the bolt 86, turn the member 79 slightly to the left to release the breech lock, then pull out the shaft 74 with member 79 and the ratchet wheel and pinion. Next place the lever 96 below its "on position," until the slidable detent 90 with its spring 110 can be withdrawn from the grooved slideway; then turn the arm 95 with the retarding pawl 103 thereon to line up the key port 102 with the key 106, and pull out the lever to withdraw its pivot shaft 105 from the housing. For reassembling the parts, the operation is substantially reversed.

By the use of a brake operating mechanism constructed in accordance with my invention, and with any such form of construction as disclosed herein, the force of stopping a spinning brake wheel in its brake-release rotation is taken up by the housing, rather than by the pawl shaft as is done in the prior and well-known constructions. This is an important advancement in this art.

The operation of this improved brake operating mechanism is substantially as follows:

When the brakes are to be set, the operating lever (61, 96) is thrown to the left, as shown in Figs. 1, 3, 5, 11 and 14, and the hand brake wheel is rotated in a clockwise direction. The slidable holding pawl or detent will then be lifted against the weight of the operating lever 61 in the form of Fig. 1, and against the lever weight and the action of the spring 110 in the form of Fig. 11, for each depression of the ratchet wheel. When the brake has been set, the tendency of the ratchet wheel to rotate in a counter-clockwise or brake release direction will serve to confine the hardened roller of the slidable detent in wedging relation in the engaged notch or depression in the ratchet wheel. When the brakeman wishes to release the brakes, he merely throws the operating lever (61, 96) into the opposite position, to the right, as shown in Figs. 4, 15 and 16, and the slidable detent will be retracted, as illustrated. Then, by exerting a downward pressure on the lever while in this position, in the first shown form of mechanism the cam projection or lip 52 will engage and press the retarding pawl 53 firmly into the depressions in the ratchet wheel; while in the second shown form the retarding pawl 103 on the end of member 95 will be pressed firmly into such depressions on the ratchet wheel; and thus in either form this will serve to dampen and restrain the unwinding of the brake chain, to the extent desired. It may be noted in this second described form the pawl 103 and member 95 are arranged so that with sufficient pressure on the lever 96 the ratchet wheel can be positively halted in its unwinding rotation toward the left, as seen in Fig. 16.

If the brakeman wishes to permit the brakes to entirely unwind, he can merely oscillate the operating lever into the position indicated in Figs. 4 and 15, without pressing down on said lever, thus releasing the slidable holding detent from the ratchet wheel and releasing the brakes, and permit the hand brake wheel to spin in the releasing movement.

It may be noted that in the brake-setting action there will be very little wear to the ratchet wheel and detent, since these teeth or projections on the wheel are gradually rounded, and the active part of the detent is a roller which thus rolls over said rounded teeth. This disclosed construction is of particular value in spotting cars; since in those operations the brakeman must hold onto the moving car with one hand while he operates the brakes with the other; and hereby the operation for one hand is facilitated, as it is only necessary to throw the releasing lever into release position and by then applying normal or proper pressure to said lever the brakes may be released to the extent of only one or two notches. For this purpose the second form is more positively effective than the first described form. If the brakeman finds that he should apply more effective braking action, then he can readily throw the lever to the opposite position or holding position and take up one or more notches, thus readily effecting herewith the exact braking action desired.

This construction is simple and durable and as it can be well lubricated at the time of installation it will operate thru many years without further attention.

I claim:

1. In brake control means, the combination of a housing having a slideway therein, a ratchet wheel having a series of shallow peripheral depressions thereby forming blunt, rounded projections, a detent having a contact portion shaped to conform to and enter said depressions, said detent being mounted for bodily sliding movement on the slideway of the housing at a tangent to the periphery of the ratchet wheel and adapted to be wedged into direct holding relation with the ratchet wheel, an oscillating lever exterior of the housing, and means within the housing and operated by said lever for actuating said detent.

2. In brake control means, the combination of a housing having a wall providing a slideway, a ratchet wheel having a series of shallow peripheral depressions thereby forming blunt, rounded projections, a detent having a contact portion shaped to conform to and enter said depressions, said detent being mounted for bodily sliding movement on the slideway of the housing at a tangent to the periphery of the ratchet wheel and adapted to be wedged into direct holding relation with the ratchet wheel, an oscillating lever exterior of the housing, and means operated by said lever within the housing for positively moving said detent out of engagement with said ratchet wheel.

3. In brake control means, the combination of a housing having a slideway therein, a ratchet wheel having a series of shallow peripheral depressions thereby forming blunt, rounded projections, a detent having a roller acting as a contact portion and being of a size to enter said depressions, said detent being mounted for bodily sliding movement on the slideway of the housing at a tangent to the periphery of the ratchet wheel and adapted to be wedged into direct holding relation with the ratchet wheel, an oscillating lever exterior of the housing, and means within the housing and operated by said lever for actuating said detent.

4. In brake control means, the combination of a housing having a wall arranged and positioned to provide a slideway, a ratchet wheel rotary in said housing and having a series of shallow peripheral depressions thereby forming blunt, rounded projections, a detent carrying a rotary contact element being of a size to enter said depressions and also adapted to roll over said projections, said detent being mounted for bodily sliding movement on the slideway at a tangent to the periphery of the ratchet wheel and said element movable into direct holding relation with said wheel, an oscillating lever exterior of the housing, and means within the housing and operated by said lever for operating said detent.

5. In brake control means, the combination of a housing having a slideway therein and also a ratchet wheel, a holding detent mounted for straight line sliding movement on said slideway at a tangent to the periphery of the ratchet wheel, said detent including a roller for engagement with the periphery of said wheel, finger means pivotally mounted in the housing for engaging said sliding detent, and an operating lever outside of the housing for operating said finger means.

6. In a hand brake including a shaft having a member thereon whereby the shaft is operable manually, a ratchet wheel attached to the shaft to rotate therewith and having rounded projections on its periphery with corresponding spaces therebetween, a holding detent having a contact portion shaped to conform to and enter said spaces, means provided with a lever for operating said detent, and pawl means associated with said operating means and adapted to be pressed into said spaces between said projections by means of said lever, whereby to exert a selected retarding effect on the ratchet wheel by the regulated pressure on said lever.

7. In a hand brake, the combination with a shaft having a hand brake wheel thereon, of a ratchet wheel attached to the shaft and having on its periphery a series of gradually rounded projections, a detent having correspondingly shaped piece for contact with the spaces between said projections, means for operating said detent, a retarding pawl having a rounded portion for non-positive engagement with said periphery of the ratchet wheel, and means associated with said detent-operating-means for exerting a force on said retarding pawl tending to press it into the depressions between said peripheral projections.

8. In brake control means, the combination of a ratchet wheel having blunt, rounded teeth, a slidable holding detent adapted to engage between said teeth, arm means for operating said detent and a lever for actuating said arm means, and a retarding pawl associated with and actuated by said arm means, adapted to successively engage the teeth on said ratchet wheel while said arm and lever are retracted to disengage the detent from the teeth, whereby to retard the brake-releasing movement of said wheel.

9. In brake control means, the combination of a ratchet wheel having blunt, rounded teeth, a sliding detent adapted to engage said ratchet wheel, an arm for operating said detent, and a retarding pawl adapted to successively engage the teeth on the ratchet wheel and being associated with and actuated by said arm when the arm is retracted to disengage the detent from the ratchet wheel and thereafter to be pressed by said arm into frictional non-positive engagement with the teeth of said wheel.

10. In brake control means, the combination of a ratchet wheel, a sliding detent adapted to engage said ratchet wheel for holding it, an arm for operating said detent, and a retarding pawl pivoted for free oscillation and adapted to engage the ratchet wheel with a sliding action in both directions of movement of said wheel, said arm having a cam projection adapted to contact said pawl when the detent has been withdrawn from engagement with the ratchet wheel, whereby to press said pawl between successive teeth of the ratchet wheel.

11. In brake operating means in which there is included a shaft carrying a ratchet wheel thereon and also a housing within which said parts are mounted, the combination of a detent arranged to slide on a wall of said housing in a line tangentially of said ratchet wheel, said detent having a recess, a member mounted on a shaft in said housing and including a finger engaging in said recess for positive movement of the detent, and an operating lever for actuating said member and finger.

12. In brake operating means in which there is included a shaft having a hand brake wheel and also a ratchet wheel thereon, provided with a housing in which said parts are mounted, the combination of a sliding detent arranged to move tangentially of said ratchet wheel, said detent comprising a sliding member having a recess, means mounted on a shaft in said housing and including a finger engaging in said recess, said shaft projecting outside of the housing and having a head providing abutments at the two sides of the axis of said shaft, a lever on said head for operating said finger, and a retarding pawl within said housing adapted to be moved into engagement with said ratchet wheel by cam means on said finger-equipped means when the parts have been moved to detent-released position.

13. In brake operating means, the combination of a housing having a wall providing a slideway, a ratchet wheel having blunt, rounded teeth on its periphery, a detent slidable on the slideway in a direction tangentially of the ratchet wheel and including a contact piece adapted to be wedged into holding relation between said teeth, a shaft carrying a member adapted to oscillate in the housing, finger means on said member engaging in a recess provided in said detent for positively releasing the detent from the ratchet wheel, and a lever outside of the housing associated with said shaft for oscillating said member to slide said detent.

14. In brake control means, the combination of a housing containing a ratchet wheel having gradually rounded teeth on its periphery, a detent slidable in said housing tangentially to the ratchet wheel and having a contact piece shaped to conform to the spaces between said teeth and movable into holding relation therein, an arm and a shaft for pivotally mounting the arm in the housing, finger means on the arm to engage the detent for positively releasing it from the ratchet wheel, a lever on said shaft outside of the housing for operating said arm, and pawl means provided on said arm adapted to successively engage the teeth when the lever and the detent are retracted, whereby to retard the ratchet wheel in its brake-releasing movement.

15. The subject matter set forth in claim 14, wherein the arm is oblong in shape and has the finger means and the pawl means formed integral on its two opposite ends.

16. The subject matter set forth in claim 14, which is further provided with spring means associated with the detent to act on the detent and the arm, so as to retain the retarding pawl out of engagement with the ratchet wheel to prevent wear of the ratchet teeth while said lever is in its brake-releasing position and said pawl is not in use.

17. In brake control means, the combination of a housing containing a ratchet wheel having on its periphery a series of gradually rounded teeth and similar depressions therebetween, a detent in the housing having a correspondingly shaped contact piece for engaging in said depressions and positively holding the ratchet wheel, a shaft and a member thereon adapted to oscillate in the housing, a lever outside of the housing for operating said shaft and member, means on said member for engaging and operating the detent, and a rounded portion on the end of said member adapted to serve as a retarding pawl and be engaged in said depressions, whereby to exert a regulated retarding effect on said wheel and also a full stop thereof by the regulated pressure on said lever.

18. The subject matter set forth in claim 17, wherein said shaft is integral with said lever and serves as the pivot means for the lever and the member in the housing.

19. The subject matter set forth in claim 17, which is further provided with a spring associated with the detent, for retaining the retarding pawl out of engagement with the teeth of the ratchet wheel and prevent wear of said teeth while the lever is in its brake-releasing position and the pawl is not in use.

AUGUSTUS F. KLASING.